United States Patent
Brashears

(10) Patent No.: US 7,199,484 B2
(45) Date of Patent: Apr. 3, 2007

(54) WATER CURRENT GENERATOR

(75) Inventor: David F. Brashears, Belle Isle, FL (US)

(73) Assignee: Gencor Industries Inc., Orlando, FL (US)

( * ) Notice: Subject to any disclaimer, the term of this patent is extended or adjusted under 35 U.S.C. 154(b) by 185 days.

(21) Appl. No.: 11/172,924

(22) Filed: Jul. 5, 2005

(65) Prior Publication Data

US 2007/0007772 A1    Jan. 11, 2007

(51) Int. Cl.
*F03B 13/05*    (2006.01)
(52) U.S. Cl. .............................. 290/54; 290/42; 290/43; 290/44; 290/53; 290/55; 416/86
(58) Field of Classification Search ................. 290/45, 290/42, 43, 44, 53, 55; 416/86
See application file for complete search history.

(56) References Cited

U.S. PATENT DOCUMENTS 3,209,156 A    9/1965    Struble, Jr.
4,102,291 A *  7/1978    Sebald ........................ 114/244
4,151,424 A *  4/1979    Bailey ......................... 290/54
4,204,943 A *  5/1980    Metrailer et al. ............. 208/50
5,592,816 A    1/1997    Williams
6,648,589 B2   11/2003   Williams
RE38,336 E     12/2003   Williams
6,729,840 B2   5/2004    Williams
6,756,695 B2   6/2004    Hibbs et al.
6,806,586 B2   10/2004   Wobben

* cited by examiner

*Primary Examiner*—Darren Schuberg
*Assistant Examiner*—Iraj A. Mohandesi
(74) *Attorney, Agent, or Firm*—Nixon & Vanderhye P.C.

(57) ABSTRACT

The underwater electrical generator includes a stator core and counter-rotating turbine blades with permanent magnets in the hubs and windings in the core housing. When tethered by the nose of the housing, the water current rotates the turbine blades generating electrical current which is supplied for commercial use via the tether to a land-based utility. Ballast tanks are provided to maintain the generator at a predetermined depth. Small stator windings and permanent magnets are provided in the rotating hubs and core housing respectively to charge batteries in the hubs for altering the pitch of the blades such that the blades can be feathered for maintenance outages.

11 Claims, 3 Drawing Sheets

WATER CURRENT GENERATOR

BACKGROUND OF THE INVENTION

The present invention relates to a generator responsive to water current for generating electricity and particularly relates to an underwater electrical current generator having turbine blades rotatable about a center body.

With increasing demand for environmentally friendly electrical power generation, many alternatives to carbon produced electrical power have been proposed. For example, in U.S. Pat. No. 3,209,156 there is disclosed an underwater generator for supplying limited electrical power to underwater measuring and sensing units. The supplied electricity provides power for underwater communications and management of oceanographic instrumentation. The generator in the afore-mentioned patent includes a central housing mounting a plurality of circumferentially spaced blades which rotate a hub journaled on the housing such that an arrangement of permanent magnets and stator windings generate electricity for powering the instrumentation. The disclosed generator, however, turns at relatively low speed compared to conventional turbines and the resulting power production potential is quite low. Commercial generation of electricity for land use is not particularly feasible employing the construction of that patent. Accordingly there is a need to develop an underwater current generator for producing electricity for commercial land uses.

In a preferred embodiment of the present invention, there is provided an electrical generator for disposition in a water current comprising: a central body carrying a plurality of stator coils within the body and defining a generally longitudinal axis; a pair of annular hubs rotatable about and carried by the central body, each of the hubs mounts a plurality of turbine blades and a plurality of magnets for generating magnetic flux, the hubs being located about the stator coils enabling generation of electricity by the interaction of the magnetic flux and the coils in response to rotation of the blades and hubs about the central body; the blades being raked back in the direction of the water current and having free ends.

In another embodiment of the present invention, there is provided an electrical generator for disposition in a water current comprising a central body carrying a plurality of stator coils within the body and defining a generally longitudinal axis; a pair of annular hubs rotatable about and carried by the central body, each of the hubs mounting a plurality of turbine blades and a plurality of magnets for generating magnetic flux, the hubs being located about the stator coils enabling generation of electricity by the interaction of the magnetic flux and the coils in response to rotation of the blades and hubs about the central body; at least portions of the blades being rotatable about axes non-parallel with the longitudinal axis to enable rotational movement of said blade portions.

DETAILED DESCRIPTION OF THE INVENTION

Figure 1:
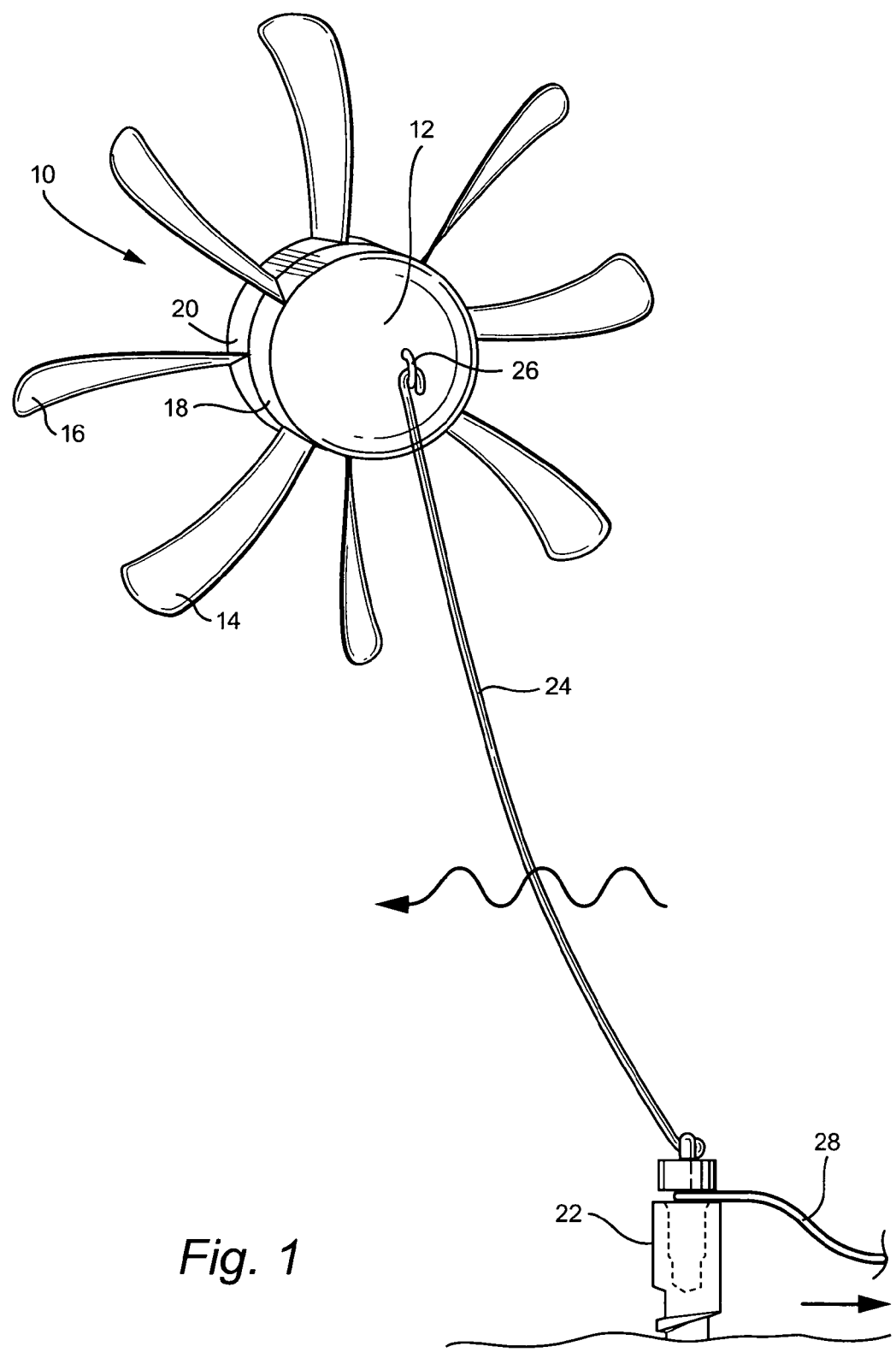
FIG. 1 is a schematic illustration of a water current electrical generator constructed in accordance with a preferred embodiment of the present invention.

Referring now to the drawing figures, particularly to FIG. 1, there is illustrated an underwater generator, generally designated 10, for producing electricity and including a stator core housing 12 and a rotor including at least a pair of counter rotating impeller or turbine blades 14 and 16 mounted on counter-rotating turbine hubs 18 and 20. As illustrated, the impeller blades 14 and 16 mounted on the hubs are circumferentially spaced one from the other and are open at their radially outer ends i.e. the tips are not connected to one another. The generator 10 is constructed for tethering to an underwater anchor 22. The tether 24 interconnects the anchor 22 and a coupling 26 on a nose of the stator housing 12. Additionally, as illustrated in FIG. 1, electricity generated by the generator 10 is preferably transmitted by electrical lines carried by tether 24 to the anchor and then via electrical lines 28 to a land base utility site for commercial distribution.

Figure 2:
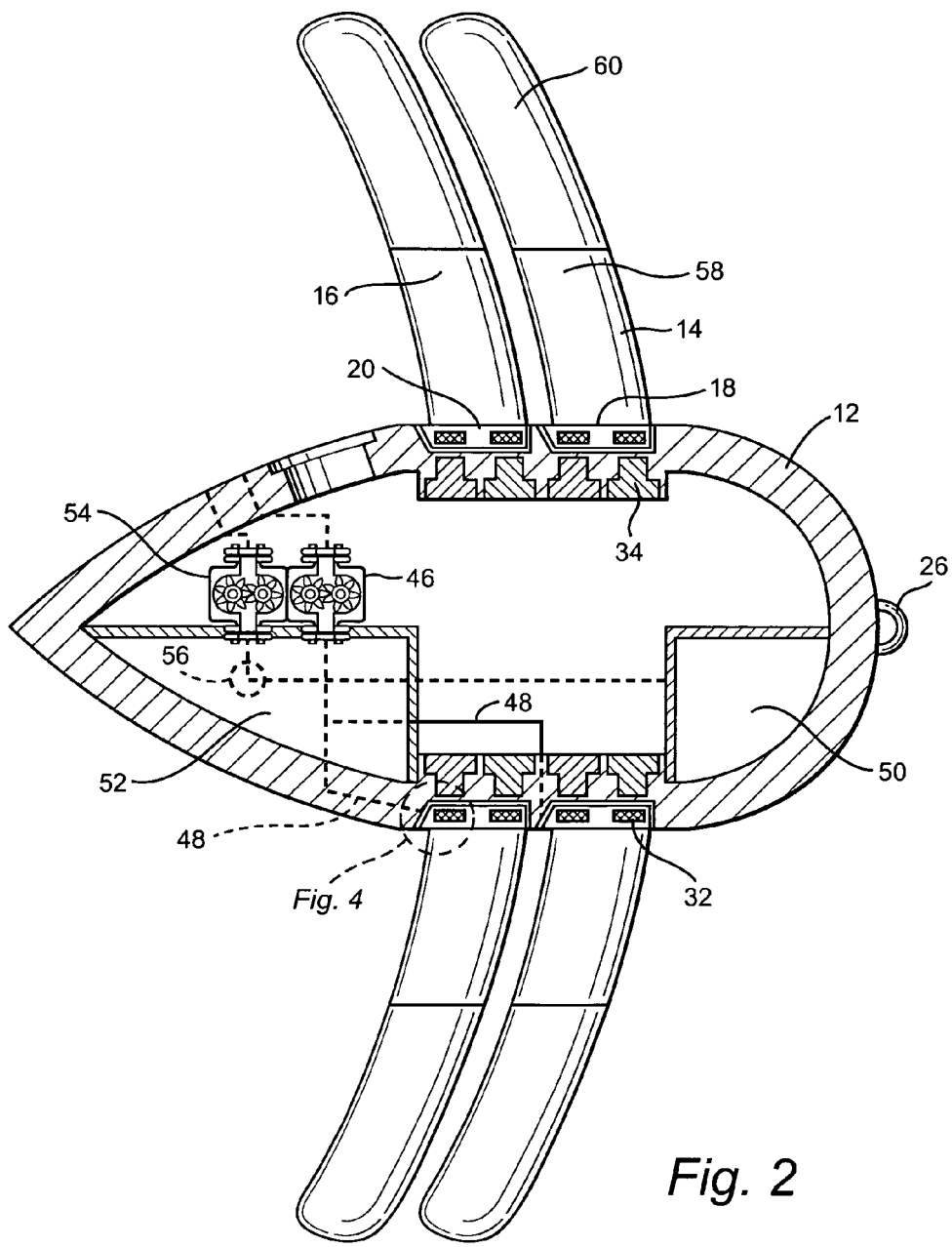
FIG. 2 is a cross sectional view thereof.

As illustrated in FIG. 2, each of the hubs 18 and 20 carries a plurality of circumferentially spaced magnets 32 in annular axially spaced arrays thereof. In radial opposition to the permanent magnets 32 are a plurality of stator coils 34 wound about iron cores and carried by the core housing 12. It will be appreciated that as the hubs 18 and 20 rotate relative to the fixed stator core, the magnetic flux in cooperation with the stator windings produces electricity. Because electric power generation is a function of the water current velocity cubed, it is very beneficial to locate the device in high current areas and to enhance the velocity of the water current passing over and through the blades. To this end, by having a large housing located in the center of the device, water which would normally pass through this area, must pass around the central housing. This increases the velocity of the water passing through the blade area, enhancing the power production. For example, for a one half megawatt turbine, the core housing diameter may be approximately 14 feet with an overall diameter of 34 feet. With those dimensions and the center of the generator plugged by the core housing 12, the velocity through the rotor blades is raised substantially e.g., about 17% resulting in an increase in theoretical power availability of about 60%.

Figure 4:
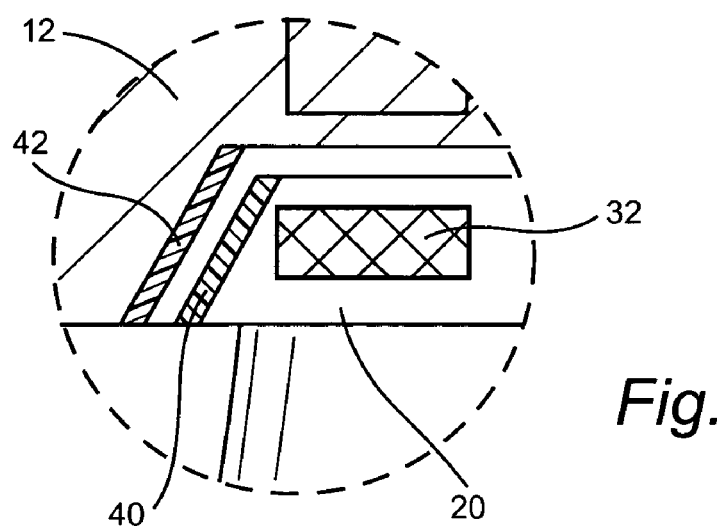
FIG. 4 is an enlarged fragmentary cross sectional view illustrating a water bearing.

Referring to FIGS. 2 and 4, the hubs 18 and 20 each terminate in tapered aft-bearing surfaces. For example, bearing surface 40 for hub 20 is tapered or inclined in an aft and radial outward direction. The cooperating bearing surface 42 on the stator core housing 12 is similarly tapered in an aft, radial outward direction. The surfaces 40 and 42 are preferably formed of a polymeric material. As a result of the taper of the surfaces, the water current acting on the blades, seats and centers the hubs 18 and 20 on axis against the tapered surfaces 42 of the core housing 12. Additionally, a hydrodynamic film is provided between the bearing surfaces 40 and 42. This is accomplished by a pump 46 located within the core housing 12. Pump 46 draws in sea water and pumps the sea water between the bearing surfaces 40 and 42 via conduits 48. The hydrodynamic film reduces friction and wear and is especially beneficial during start-up since once the turbine blades are up to speed, the blades are centered magnetically. This additionally would assist in offsetting axial thrusts at speed. Further, the filtration of the forced lubricating water by the installation of magnets and filters in the suction line to the pump would help keep debris from penetrating the gap between the stator and rotor and maintain magnetic materials away from the magnetic areas caused by the permanent magnets in the rotor and the coils in the stator.

As best illustrated in FIG. 2, the blades 14 and 16 are raked back in the direction of the current flow. Additionally, as illustrated in FIG. 1, the blades 14 and 16 are open at their outer ends. This assists in maintaining the blades free of debris enabling the blades to slough off debris from the rotor.

As previously noted, the rotors are counter-rotated. Thus the net torque on the core housing can be balanced out to zero whereby the housing 12 is prevented from spinning and is maintained in a substantially non-rotatable orientation. While the blades preferably counter-rotate independently of one another, the blades may be geared to one another so that they turn at the same rotational speed. This can be accomplished with mechanical gearing or by placing thrust wheels between the two rotors. Also, with the two stators are tied together electrically, the two rotors will be forced electrically to turn at the same rotational speeds which may eliminate any need for mechanical synchronization. Further, the forward rotor is anticipated to be more efficient in the water current than the aft rotor. The aft rotor may therefore have a larger diameter than the forward rotor in order to substantially balance the torques.

Ballast compartments are provided in the core housing 12. Particularly, a forward ballast compartment 50 and an aft ballast 52 are provided. A pump 54, illustrated in FIG. 2, is provided for pumping sea water to and from the fore and aft ballast compartments 50 and 52, respectively. The pressure side of the pump 54 communicates through a valve 56 with either the forward ballast compartment 50, the aft ballast compartment 52, or both compartments. The ballast compartments may be ballasted to maintain the generator at an adjustable and optimal depth below the water surface. The device can therefore be raised or lowered to optimize power production by locating the device in the highest current. Additionally, should the current be too strong at a given depth, alternate depths can be achieved by adjusting the ballast. The ballast compartments as illustrated are located in the lower portion of the core housing leaving the upper portion of the core housing free for installation of necessary electrical equipment. Consequently, the ballast acts as a pendulum and facilitates preventing the generator central body from rotating. Since there is only one point connection i.e., the tether 24, the generator is free to pivot in any direction around the anchor point to remain oriented into the current without causing excessive strain on one side or the other. Also, by having both a fore and aft ballast tank, the attitude of the device in the current can be adjusted.

The rotation of the blades can be stopped when maintenance on the generator is necessary notwithstanding the continuous flow of the underwater current. Thus, it may be necessary to stop the rotation of the blades and the generation of electricity to service the generator. Stopping the generation of electricity may be accomplished by disconnecting the load. However, this does not stop the rotation of the blades and may increase their rotational velocity in the absence of the load. Moreover, the generator may continue to create voltage and that voltage and parasitic currents could be hazardous to maintenance personnel, as well as to the equipment due to overheating and insulation breakdown.

To stop the blade rotation, and to stop the rotation of the blades which would otherwise increase the drag of the generator and hence increase the load on the tether, the rotor blades are feathered. As illustrated, the blades are twisted along their lengths and there is no typical position of the blades, even when feathered, which would absolutely prevent rotation. The turbine blades 14 and 16 are therefore preferably formed in two parts i.e. an inner blade portion 58 and an outer blade portion 60. A shaft 62 (FIG. 3) interconnects the outer and inner blade portions. Consequently, by rotating the shaft 62 relative to the inner blade portion 58, the outer blade portion 60 may be rotationally aligned into a feathered position, i.e., a position with twists in the opposite direction than the twist of the inner portion 58 of the blade. The opposite twists of the inner and outer blade portions thus tends to feather the overall blade.

Figure 3:
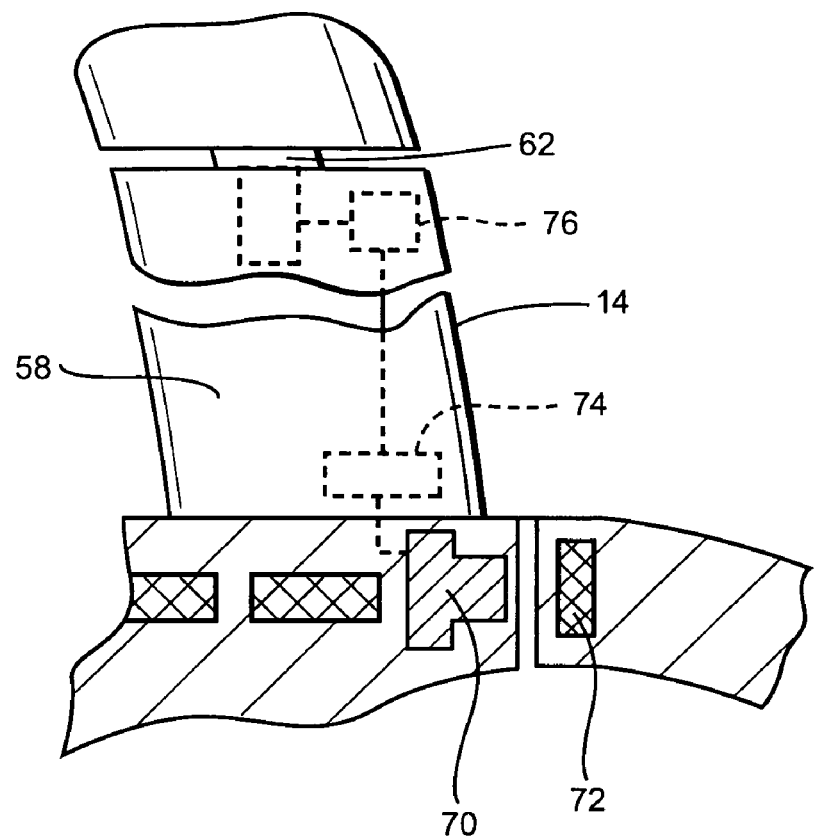
FIG. 3 is a fragmentary enlarged cross sectional view thereof illustrating a method and apparatus for tethering the blades during battery recharging operations.

The underwater environment of the electrical generator poses the problem of how to feather the blades in that environment. Referring to FIG. 3, there is provided, preferably in each of the hubs 18 and 20, a field winding 70 in opposition to a plurality of permanent magnets 72 on the stator housing 12. Both the hub and the stator housing serve as a stator and rotor respectively. The stator windings 70 may be very small and only generate sufficient power to maintain a storage charge on batteries located in the hub e.g., battery 74. The batteries 74 in turn are coupled to an electrical actuator 76 mechanically coupled to the shaft 62 to rotate the shaft and hence the outer portion 60 of the blade. Mechanical interlocks between the inner and outer blades may be provided once the outer portions 60 of the blades are rotated to the desired operational and feathered positions. The stator winding 70 and permanent magnets 72 do not impose a drag on the rotation of the hubs except when charging the battery 74. When fully charged, there is no load imposed on the hub. Electrical signals to effect feathering of the blades i.e. actuation of the actuator 76 can be accomplished by signals between the core housing 12 and the rotors. The outer portions of the rotors also can be adjusted relative to one another to balance the load carried by the generator. Consequently when the generator is taken out of service e.g., for maintenance, the outer portions of the blades are rotated to a position where there is little or no resulting torque created by the water current on the blades. Additionally, when feathered, the resulting drag on the generator body is dramatically less than if the blades are merely stopped e.g., by brakes. Once the blades are stopped, the ballast in the core housing 12 is adjusted to float the generator to the surface for maintenance. In this manner, the electrical and mechanical hazards due to rotor rotation can be minimized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrical generator for disposition in a water current comprising:

a central body carrying a plurality stator coils within the body and defining a generally longitudinal axis;

a pair annular hubs rotatable about and carried by said central body, each of said hubs mounting a plurality of turbine blades and a plurality of magnets for generating magnetic flux, said hubs being located about said stator coils enabling generation of electricity by the interaction of the magnetic flux and the coils in response to rotation of the blades and hubs about said central body;

said blades being raked back in the direction of the water current and having free ends; and said hubs and said central body including registering bearing surfaces, and a pump carried by said central body for pumping water into the bearings to provide a hydrodynamic film between the bearing surfaces.

2. A generator according to claim 1, wherein said bearing surfaces are inclined relative to said longitudinal axis to self center the hubs on the central body.

3. A generator according to claim 1 wherein at least portions of said blades are rotatable about axes non-parallel with the longitudinal axis to enable the rotational movement of said blade portions.

4. A generator according to claim 3, wherein said blade portions are carried by shafts, each having an axis, and including actuators for rotating said blade portions about the shaft axes.

5. A generator according to claim 4, including second magnets carried by said central body and second field windings carried by at least one of said hubs enabling generation of electricity by the interaction of the magnetic flux of the second magnets and the second field windings for driving said actuators.

6. A generator according to claim 5, wherein said second magnets and said second field windings are electrically coupled to at least one battery carried by said one rotatable hub and blades carried thereby for charging the battery as said one hub and blades rotate relative to the center body.

7. A generator according to claim 6, wherein said battery is electrically coupled to said actuators to rotate said blade portions.

8. A generator according to claim 3, including a tether coupled to said central body.

9. An electrical generator for disposition in a water current comprising:

a central body carrying a plurality of stator coils within the body and defining a generally longitudinal axis;

a pair of annular hubs rotatable about and carried said central body, each said hubs mounting a plurality of turbine blades and plurality of magnets for generating magnetic flux, said hubs being located about said stator coils enabling generation of electricity by the interaction of the magnetic flux and the coils in response to rotation of the blades and hubs about said central body;

at least portions of said blades being rotatable about axes non-parallel with the longitudinal axis to enable rotational movement of said blade portions;

said blade portions being carried by shafts, each having an axis, and including actuators for rotating said blade portions about the shaft axes second magnets carried by said central body and second field windings carried by at least one of said hubs enabling generation of electricity by the interaction of the magnetic flux of the second magnets and the second field windings for driving said actuators; and said second magnets and said second field windings being electrically coupled to at least one battery carried by said one rotatable hub and blades carried thereby for charging the battery as said one hub and blades rotate relative to the center body.

10. A generator according to claim 9 wherein said battery is electrically coupled to said actuators to rotate said blade portions.

11. A generator according to claim 9 including a tether coupled to said central body.

* * * * *